United States Patent
Bregman et al.

(10) Patent No.: US 12,001,327 B2
(45) Date of Patent: Jun. 4, 2024

(54) EXECUTION PLATFORM ASSIGNMENTS IN CI/CD SYSTEMS

(71) Applicant: Red Hat, Inc., Raleigh, NC (US)

(72) Inventors: Arie Bregman, Gan Yavne (IL); Steve Mattar, Herzliya (IL)

(73) Assignee: Red Hat, Inc., Raleigh, NC (US)

( * ) Notice: Subject to any disclaimer, the term of this patent is extended or adjusted under 35 U.S.C. 154(b) by 171 days.

(21) Appl. No.: 17/370,305

(22) Filed: Jul. 8, 2021

(65) Prior Publication Data
US 2023/0009997 A1 Jan. 12, 2023

(51) Int. Cl.
*G06F 11/36* (2006.01)
*G06N 20/00* (2019.01)

(52) U.S. Cl.
CPC ......... *G06F 11/3688* (2013.01); *G06N 20/00* (2019.01)

(58) Field of Classification Search
CPC ............ G06F 11/3688; G06F 11/3664; G06F 11/3672; G06F 8/70; G06N 20/00
See application file for complete search history.

(56) References Cited

U.S. PATENT DOCUMENTS

| | | | |
|---|---|---|---|
| 9,612,821 B2 | 4/2017 | Iyer et al. | |
| 10,033,833 B2 | 7/2018 | Fu et al. | |
| 10,452,435 B2 | 10/2019 | Novak et al. | |
| 10,853,059 B2 | 12/2020 | Mills | |
| 11,144,289 B1 * | 10/2021 | Hwang | G06N 5/022 |
| 11,221,908 B1 * | 1/2022 | Batta | G06F 11/3072 |
| 2015/0026121 A1 * | 1/2015 | Shani | G06F 16/24578 707/748 |
| 2016/0253172 A1 * | 9/2016 | Shani | G06F 8/70 717/101 |
| 2019/0097900 A1 | 3/2019 | Rodriguez et al. | |
| 2019/0235846 A1 * | 8/2019 | Janjua | G06Q 10/067 |
| 2020/0110693 A1 * | 4/2020 | Herrin | G06F 8/355 |
| 2020/0133651 A1 * | 4/2020 | Holzer | G06F 8/65 |
| 2020/0257514 A1 * | 8/2020 | Gadgil | H04L 67/34 |

(Continued)

OTHER PUBLICATIONS

Lintao Xian, Lintao et al., IEEE, "H-PS: A Heterogeneous-Aware Parameter Server With Distributed Neural Network Training", https://ieeexplore.ieee.org/stamp/stamp.jsp?arnumber=9356607, Feb. 18, 2021, 10 pages.

(Continued)

*Primary Examiner* — Matthew M Kim
*Assistant Examiner* — Matthew N Putaraksa
(74) *Attorney, Agent, or Firm* — Womble Bond Dickinson (US) LLP

(57) ABSTRACT

A method includes receiving, by a processing device, a definition of a continuous integration and continuous delivery/deployment (CI/CD) pipeline, obtaining, by the processing device in view of the definition, a characterization of the CI/CD pipeline indicative of a use case of the CI/CD pipeline, identifying, by the processing device from a heterogeneous pool of execution platforms, a set of candidate execution platforms in view of the characterization, selecting, by the processing device from the set of candidate execution platforms, a subset of execution platforms having a combination of attributes for executing the CI/CD pipeline, and assigning, by the processing device, the subset of execution platforms to the CI/CD pipeline for execution.

20 Claims, 5 Drawing Sheets

(56) References Cited

U.S. PATENT DOCUMENTS

| | | | | |
|---|---|---|---|---|
| 2021/0142159 A1* | 5/2021 | Gupta | .................... | H04L 67/30 |
| 2022/0147346 A1* | 5/2022 | Ahuja | ....................... | G06F 8/71 |
| 2022/0164244 A1* | 5/2022 | Elluri | .................. | G06F 11/0769 |
| 2022/0245507 A1* | 8/2022 | Yen | .......................... | G06N 7/01 |
| 2022/0308919 A1* | 9/2022 | Atmakur | .................. | G06F 8/35 |
| 2022/0398132 A1* | 12/2022 | Goh | ................... | G06F 11/3006 |

OTHER PUBLICATIONS

Wu, Dongyao, et al., IEEE, "Building Pipelines for Heterogeneous Execution Environments for Big Data Processing", https://www.researchgate.net/Publication/296480327_Building_Pipelines_for_Heterogeneous_Execution_Environments_for_Big_Data_Processing, Mar. 2016, 9 pages.

* cited by examiner

EXECUTION PLATFORM ASSIGNMENTS IN CI/CD SYSTEMS

TECHNICAL FIELD

The present disclosure is generally related to computer systems, and more particularly, to execution platform assignments in continuous integration and continuous delivery/deployment (CI/CD) systems.

BACKGROUND

Platform-as-a-Service (PaaS) system offerings can include software and/or hardware facilities for facilitating the execution of web applications in a cloud computing environment (the "cloud"). Cloud computing is a computing paradigm in which a user engages a "cloud provider" to execute a program on computer hardware owned and/or controlled by the cloud provider. A cloud provider can make virtual machines (VMs) and/or containers hosted on its computer hardware available to customers for this purpose. A container is a "lightweight" execution environment having relaxed isolation properties (as compared to VMs) for sharing an Operating System (OS) among applications. Similar to a VM, a container can have its own filesystem, share of processing, memory, process space, etc. A container for an application can be packaged, together with libraries and dependencies and decoupled from the underlying infrastructure, making the container portable (e.g., portable across clouds and OS distributions). The cloud provider can provide an interface that a user can use to requisition VMs and/or containers and associated resources such as security policies, processors, storage, and network services, etc., as well as an interface to install and execute the user's applications and files. PaaS system offerings can facilitate deployment of web applications without the cost and complexity of buying and managing the underlying hardware and software and provisioning hosting capabilities, providing the facilities to support the complete life cycle of building and delivering web applications and services entirely available from the Internet.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
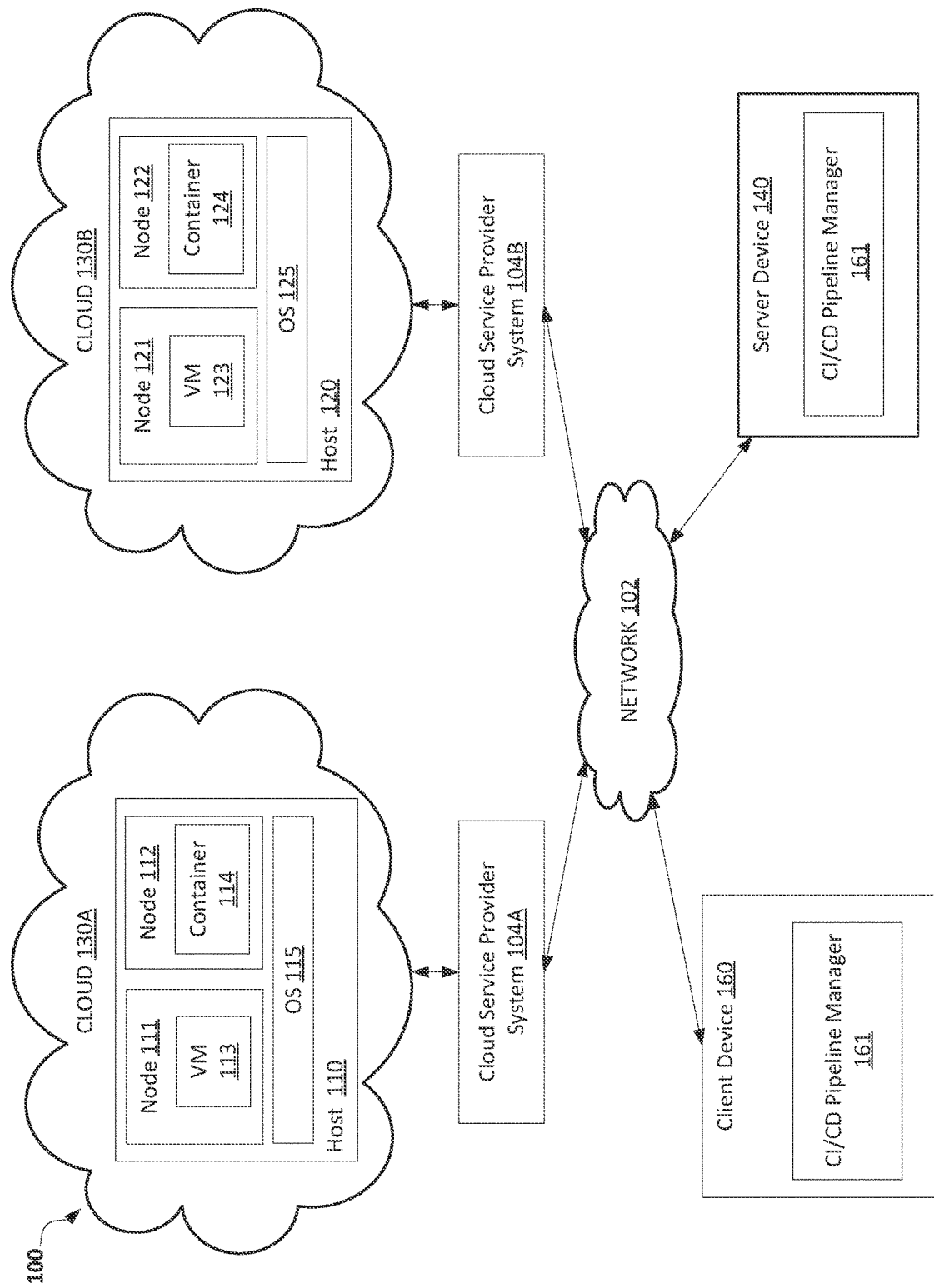
FIG. 1 depicts a high-level component diagram of an example computer system architecture, in accordance with one or more aspects of the present disclosure.

Described herein are methods and systems for implementing execution platform assignments in continuous integration and continuous delivery/deployment (CI/CD) systems. CI/CD is a method to deliver applications to customers by introducing automation into the stages of software (e.g., application) development. CI/CD is a solution to the problems integrating new code can cause for development and operations teams. CI/CD introduces ongoing automation and continuous monitoring throughout the software lifecycle, from integration and testing phases to delivery and deployment phases. Taken together, this sequence of operations are often referred to as a "CI/CD pipeline" and are supported by development and operations ("DevOps") teams working together in an agile way with either a DevOps or Site Reliability Engineering (SRE) approach.

Continuous integration (CI) generally refers to an automation process for developers. Successful CI means new code changes can be regularly built, tested, and merged to a shared repository. CI provides a solution to the problem of having too many potentially conflicting branches of an application in development. The "CD" in CI/CD stands for continuous delivery and/or continuous deployment, which are related concepts that sometimes get used interchangeably. Both continuous delivery and continuous deployment generally refer to automating further stages of the CI/CD pipeline.

For example, continuous delivery generally means that a developer's software changes are automatically bug tested and uploaded to a repository, where they can then be deployed to a live production environment by the operations team. Continuous delivery provides a solution to the problem of poor visibility and communication between developer and business teams. To that end, the purpose of continuous delivery is to ensure that it takes minimal effort to deploy new code.

Continuous deployment can refer to automatically releasing a developer's changes from the repository to production, where it is usable by customers. Continuous deployment addresses the problem of overloading operations teams with manual processes that slow down delivery, and builds on the benefits of continuous delivery by automating the next pipeline stage ("stage") in the CI/CD pipeline. A stage includes a set of tasks or jobs where, if every task in a given stage succeeds, then the CI/CD pipeline can transition to the next stage. If a task in the given stage fails, then CI/CD pipeline can prematurely terminate or, in some cases, move to the next stage.

Examples of pipeline stages include a build stage, a test stage, a release stage, and a deploy stage. The build stage can include a compile task that compiles software (e.g., application) to obtain a build. The test stage can include one or more testing tasks that perform one or more automated tests on the build to ensure that the build is ready for release and deployment. After the test stage, the release stage can include a release task to automatically deliver the build to a repository. The deploy stage can include a deploy task to automatically deploy the build into production.

When executed, a CI/CD pipeline implements a workflow to automatically perform the stages described above. The sequence of operations can include a sequence of commands, conditional and/or unconditional execution control transfers, etc. For example, when creating a CI/CD pipeline definition, a location of a test directory in a project can be identified, and then the CI/CD pipeline definition can be created automatically to execute one or more tests from the test directory.

A set of execution platforms, also referred to as a set of worker machines or hosts ("workers"), can be used to execute the tasks of a CI/CD pipeline as provided by the CI/CD pipeline definition. The set of execution platforms can include one or more execution platforms. For example, multiple tasks in a given stage can be executed in parallel based on the number of available execution platforms. An execution platform can have a corresponding platform type (e.g., virtual machine, container, or bare-metal) and set of resource specifications or parameters (e.g., processing, memory, networking). The platform type and the set of resource specifications can collectively be referred to as a combination of attributes for executing a CI/CD pipeline.

In a typical scenario, the set of execution platforms can be selected from a pool of execution platforms for assignment or linking to the CI/CD pipeline. Assigning refers to designating the set of execution platforms to the CI/CD pipeline for execution (e.g., linking the set of execution platforms to the CI/CD pipeline). If no execution platforms are assigned to the CI/CD pipeline, one or more default execution platforms can be selected. The pool can be a homogeneous pool or a heterogeneous pool. A homogeneous pool, also referred to as a unified pool, is a pool in which each execution platform has the same combination of attributes for executing a CI/CD pipeline. For example, each execution platform has the same platform type (e.g., virtual machine, container, or bare-metal) and the same set of resource specifications. In contrast, a heterogeneous pool is a pool in which at least one execution platform has a different combination of attributes for executing a CI/CD pipeline.

One missing piece in being able to fully automate CI/CD pipeline execution is the ability to automatically select a set of execution platforms from a pool for assignment to a CI/CD pipeline, and assign the set of execution platforms to the CI/CD pipeline. It may be possible to automatically select a suitable number of execution platforms from a homogeneous pool (since each execution platform of a homogeneous pool has the same combination of attributes for executing the CI/CD pipeline). However, issues can arise in the context of selecting a set of execution platforms from a heterogeneous pool, as it may be difficult to identify an appropriate or optimal set of execution platforms. For example, a CI/CD pipeline can be implemented using a number of different components (e.g., libraries), and can inherit aspects of other CI/CD pipelines.

Aspects of the present disclosure address the above noted and other deficiencies by implementing automatic execution platform assignments in CI/CD systems. A CI/CD pipeline definition, which can be a newly created definition, can be automatically assigned to a set of execution platforms of a pool. The set of execution platforms can include one or more execution platforms. In some embodiments, the pool is a heterogeneous pool.

To assign a set of execution platforms from a pool to implement the CI/CD pipeline, a characterization of the CI/CD pipeline can be obtained. The characterization can be indicative of a use case of the CI/CD pipeline.

In some embodiments, obtaining the characterization can include expanding a definition of the CI/CD pipeline to obtain an expanded definition, and analyzing the expanded definition to identify a use case for the CI/CD pipeline. As will be described in further detail herein, a particular use case can be identified from content within the expanded definition that includes code known as being used to perform the particular use case.

In some embodiments, instead of expanding the definition, obtaining the characterization can include executing the CI/CD pipeline, and performing a profiling analysis in view of the execution to identify the use case for the CI/CD pipeline. The profiling analysis can be used to obtain an understanding of what type of use case is being executed by the CI/CD pipeline is (e.g., application-level testing or OS-level testing).

Once obtained, the characterization can be used to select the set of execution platforms from the pool for assignment to the CI/CD pipeline. For example, the characterization can be used to determine a combination of attributes that are suitable to execute the CI/CD pipeline for the use case indicated by the characterization. The combination of attributes can include platform type (e.g., virtual machine, container or bare-metal) and a set of resource specifications (e.g., processing, memory).

To address situations in which multiple execution platforms exist in the pool for executing the CI/CD pipeline, machine learning techniques can be used to learn which combination(s) of attributes are optimal for executing the CI/CD pipeline. An optimal combination of attributes can be a minimum combination of attributes for executing the CI/CD platform, which can free up execution platforms in the pool that are capable of handling more resource-intensive execution tasks.

For example, a model can be trained to learn the optimal combination of attributes for executing the CI/CD pipeline. The model training can be performed by executing the CI/CD pipeline using various training execution platforms having different combinations of attributes. Each execution result (e.g., pass or fail) can be associated with its corresponding combination of attributes, where execution platforms having failing combinations of attributes are rejected from execution of the particular CI/CD pipeline. Therefore, by filtering combinations of attributes based on execution results (e.g., using a classification model or other suitable model), the model can be trained after a sufficient number of training samples to identify the minimum combination of attributes to execute the CI/CD pipeline.

Thus, the systems and methods described herein can enable automatic execution platform assignment to CI/CD pipelines. Accordingly, the systems and methods described herein can be used to optimize performance, costs, etc. with respect to implementing a CI/CD pipeline.

FIG. 1 is a block diagram of a network architecture 100 in which implementations of the disclosure may operate. In some implementations, the network architecture 100 may be used in a containerized computing services platform. A containerized computing services platform may include a Platform-as-a-Service (PaaS) system, such as Red Hat® OpenShift®. The PaaS system provides resources and services (e.g., micro-services) for the development and execution of applications owned or managed by multiple users. A PaaS system provides a platform and environment that allow users to build applications and services in a clustered compute environment (the "cloud"). Although implementations of the disclosure are described in accordance with a certain type of system, this should not be considered as limiting the scope or usefulness of the features of the disclosure. For example, the features and techniques described herein can be used with other types of multi-tenant systems and/or containerized computing services platforms.

As shown in FIG. 1, the network architecture 100 includes one or more cloud-computing environment 130A, 130B (also referred to herein as a cloud(s)) that includes nodes 111, 112, 121, 122 to execute applications and/or processes associated with the applications. A "node" providing computing functionality may provide the execution environment for an application of the PaaS system. In some implementations, the "node" may include a virtual machine (VMs 113, 123) that is hosted on a physical machine, such as host 110, 120 implemented as part of the clouds 130A, 130B. For example, nodes 111 and 112 are hosted on physical machine of host 110 in cloud 130A provided by cloud provider 104A. Similarly, nodes 121 and 122 are hosted on physical machine of host 120 in cloud 130B provided by cloud provider 104B. In some implementations, nodes 111, 112, 121, and 122 may additionally or alternatively include a group of VMs, a container (e.g., container 114, 124), or a group of containers to execute functionality of the PaaS applications. When nodes 111, 112, 121, 122 are implemented as VMs, they may be executed by operating systems (OSs) 115, 125 on each host machine 110, 120. It should be noted, that while two cloud providers systems have been depicted in FIG. 1, in some implementations more or fewer cloud service provider systems 104 (and corresponding clouds 130) may be present.

In some implementations, the host machines 110, 120 can be located in data centers. Users can interact with applications executing on the cloud-based nodes 111, 112, 121, 122 using client computer systems (not pictured), via corresponding client software (not pictured). Client software may include an application such as a web browser. In other implementations, the applications may be hosted directly on hosts 110, 120 without the use of VMs (e.g., a "bare metal" implementation), and in such an implementation, the hosts themselves are referred to as "nodes".

In various implementations, developers, owners, and/or system administrators of the applications may maintain applications executing in clouds 130A, 130B by providing software development services, system administration services, or other related types of configuration services for associated nodes in clouds 130A, 130B. This can be accomplished by accessing clouds 130A, 130B using an application programmer interface (API) within the applicable cloud service provider system 104A, 104B. In some implementations, a developer, owner, or system administrator may access the cloud service provider system 104A, 104B from a client device (e.g., client device 160) that includes dedicated software to interact with various cloud components. Additionally, or alternatively, the cloud service provider system 104A, 104B may be accessed using a web-based or cloud-based application that executes on a separate computing device (e.g., server device 140) that communicates with client device 160 via network 102.

Client device 160 is connected to hosts 110 in cloud 130A and host 120 in cloud 130B and the cloud service provider systems 104A, 104B via a network 102, which may be a private network (e.g., a local area network (LAN), a wide area network (WAN), intranet, or other similar private networks) or a public network (e.g., the Internet). Each client 160 may be a mobile device, a PDA, a laptop, a desktop computer, a tablet computing device, a server device, or any other computing device. Each host 110, 120 may be a server computer system, a desktop computer or any other computing device. The cloud service provider systems 104A, 104B may include one or more machines such as server computers, desktop computers, etc. Similarly, server device 140 may include one or more machines such as server computers, desktop computers, etc.

In some implementations, the client device 160 may include a CI/CD pipeline manager 161. The CI/CD pipeline manager 161 can assign a set of execution platforms to a CI/CD pipeline for execution. For example, the CI/CD pipeline manager 161 can receive a definition of a CI/CD pipeline, and obtain a characterization indicative of a use case of the CI/CD pipeline from the definition. The CI/CD pipeline manager 161 can identify, from a pool of execution platforms, a set of candidate execution platforms having a platform type corresponding to the characterization. For example, the set of candidate execution platforms can include one or more execution platforms that are currently available for assignment to the CI/CD pipeline. From the set of candidate execution platforms, the CI/CD pipeline manager 161 can select a subset of execution platforms having a combination of attributes for executing the CI/CD platform, and assign the subset of execution platforms to the CI/CD pipeline for execution. The CI/CD pipeline manager 161 can further cause the subset of execution platforms to execute the CI/CD pipeline. Further details regarding the functionality of the CI/CD pipeline manager 161 are described below with reference to FIGS. 2-4.

CI/CD pipeline manager 161 may be an application that executes entirely on client device 160. In other implementations, CI/CD pipeline manager 161 may function in whole or in part on server device 140. In such instances, CI/CD pipeline manager 161 can function as a web-based or cloud-based application that is accessible to the user via a web browser or thin-client user interface that executes on client device 160. In some implementations, a portion of CI/CD pipeline manager 161 may execute on client device 160 and another portion of CI/CD pipeline manager 161 may execute on server device 140. While aspects of the present disclosure describe CI/CD pipeline manager 161 as implemented in a PaaS environment, it should be noted that in other implementations, CI/CD pipeline manager 161 can also be implemented in an Infrastructure-as-a-Service (Iaas) environment associated with a containerized computing services platform, such as Red Hat® OpenStack®. The functionality of CI/CD pipeline manager 161 to convert a CI/CD pipeline into a container image file for implementing a container will now be described in further detail below with respect to FIGS. 2-4.

Figure 2:
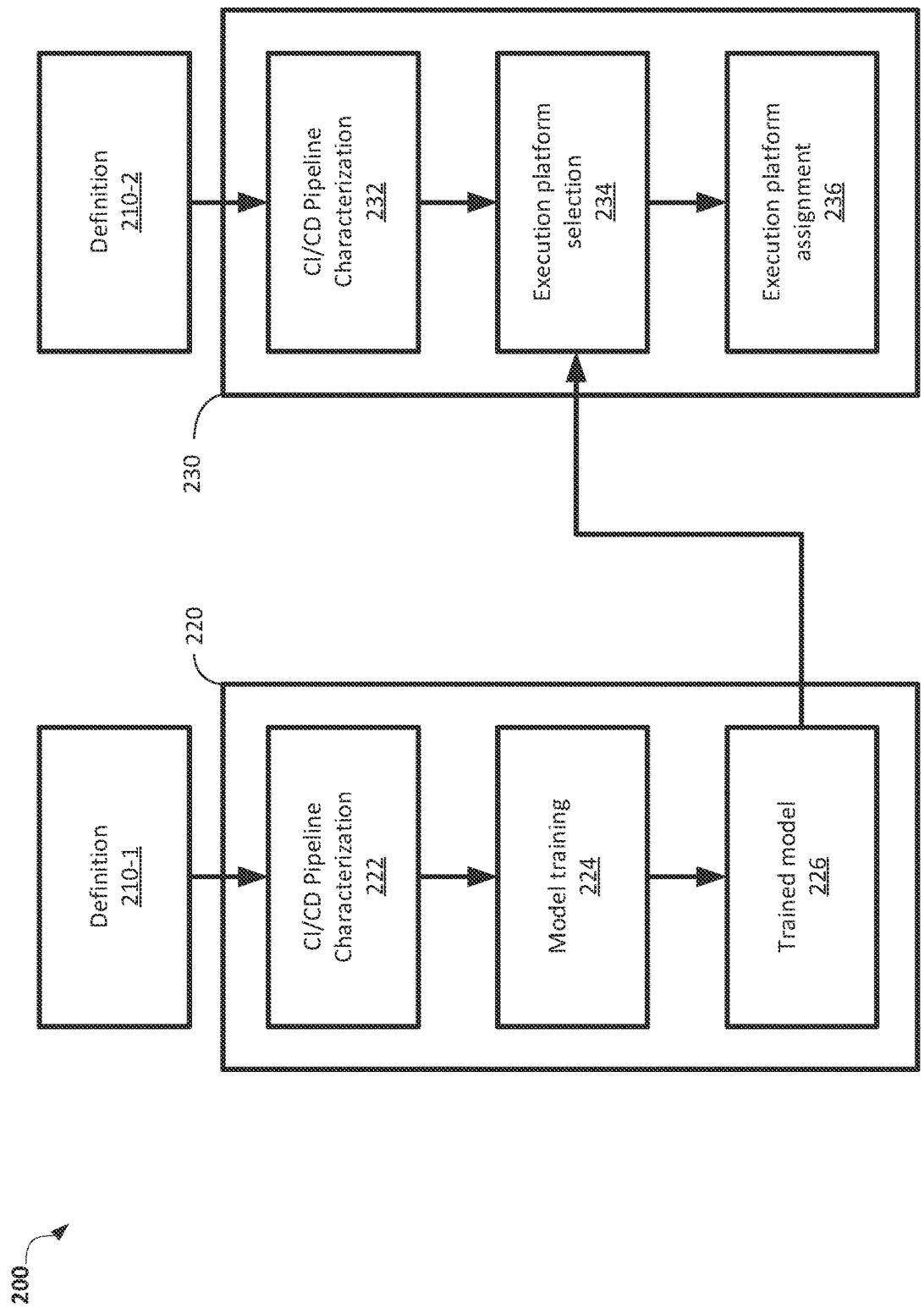
FIG. 2 depicts a block/flow diagram of a system for implementing execution platform assignments in CI/CD systems, in accordance with one or more aspects of the present disclosure.

FIG. 2 depicts a block diagram illustrating a system 200 for implementing execution platform assignments in CI/CD systems, in accordance with one or more aspects of the present disclosure. For example, one or more aspects of the system 200 can be implemented by the CI/CD pipeline manager 161 of FIG. 1.

As shown, a CI/CD pipeline definition ("definition") 210-1 is received by a training manager 220. The definition 210-1 can include code that defines a set of stages of a CI/CD pipeline. The definition 210-1 can include references to other code that is not visible in the definition 210-1. The set of stages can include one or more stages each implementing a set of tasks. The set of tasks can include one or more tasks. For example, the set of stages can include a build stage, a test stage, a release stage, and a deploy stage. The build stage can include a compile task that compiles software (e.g., application) to obtain a build. The test stage can include one or more testing tasks that perform one or more automated tests on the build to ensure that the build is ready for release and deployment. After the test stage, the release stage can include a release task to automatically deliver the build to a repository. The deploy stage can include a deploy task to automatically deploy the build into production.

The training manager 220 can use the definition 210-1 to generate a model that can be used to select a set of execution platforms from a pool of execution platforms for assignment to a CI/CD pipeline. In some embodiments, the pool is a heterogeneous pool of execution platforms. For example, the training manager 220 can include a CI/CD pipeline characterization component 222 to receive the definition 210-1, obtain a characterization indicative of a use case of the CI/CD pipeline in view of the definition 210-1.

In some embodiments, the component 222 obtains the characterization by expanding the definition 210-1 to obtain an expanded definition, and identifying the use case of the CI/CD pipeline from the expanded definition. As mentioned above, the definition 210-1 can include references to other code that is not visible in the definition 210-1. The expansion of the definition 210-1 makes this previously non-visible code visible in the expanded definition. For example, the expanded definition can include functions and libraries used by the CI/CD pipeline. The definition 210-1 can be expanded by performing a marking process to mark locations of references and imports within the definition 210-1. For each reference and import, recursion can be used to locate code and start the marking process again. Eventually, this process will generate the expanded definition.

Identifying the use case of the CI/CD pipeline can include analyzing the expanded definition to identify content indicative of the use case of the CI/CD pipeline. The content indicative of the use case can include code that is known as being characteristic for the implementation of a particular use case, such that the existence of the code can be used to identify the particular use case. For example, identifying the content indicative of the use case can include comparing the code from the expanded definition to one or more lists describing the For example, one category of CI/CD pipeline use case is testing, which can include application testing, operating system testing, etc. With respect to application-level testing, the content of the expanded definition can include one or more tests for testing an application for execution on any suitable distribution (e.g., Linux distribution) at the application code level. For example, content indicative of application-level testing can include code related to a unit test, code related to a styling test, etc. Since application-level testing is performed at the application code level, content indicative of application-level testing generally does not make use of binaries (e.g., compiled or executable programs) in the OS, and is therefore not related to analyzing OS performance, analyzing operations like application programming interface (API) calls, etc.

With respect to OS-level testing, the content can include one or more tests that are related to analyzing OS performance. In contrast to application-level testing, content indicative of OS-level testing goes beyond the application code to analyze OS performance. For example, the content for OS-level testing can be used to analyze how an application works with the OS, analyze performance of the OS using binaries, analyze OS interaction with services, etc. For example, content indicative of OS-level testing can include content related to loading kernel modules, changing firewall rules, interaction with services, etc.

In some embodiments, the component 222 obtains the characterization by executing the CI/CD pipeline, and performing a profiling analysis in view of the execution to identify the use case for the CI/CD pipeline. The profiling analysis is performed to understand what the CI/CD pipeline is doing and how it is being performed. For example, the profiling analysis can be performed to determine whether the CI/CD pipeline is performing application-level testing or OS-level testing.

To do so, one or more command-line interface (CLI) tools can be executed repeatedly over the entire CI/CD pipeline execution to obtain the set of performance results, and the profiling analysis can be performed based on the set of performance results. An additional step in the profiling process can include identifying connections between the outputs of different sources/commands to understand how one operations affects another resource (e.g., how opening 100 connections can lead to high processing resource usage). It can be important to log the time to make these connections and understand which operation led to a particular result.

Examples of performance results that can be included in the set of performance results include memory usage (e.g., how much RAM is being used), I/O usage, network usage (e.g., how many network connections exist), etc. For example, in a Unix or Unix-like (e.g. Linux) environment, examples of CLI tools that can be used to obtain the set of performance results include at least one of free command that summarizes memory usage, a sar (System Activity Report) command that obtains metrics such as processing usage, memory usage, I/O usage, etc., a netstat (Network Statistics) command that obtains an overview of network activities, indicates which ports are open/closed, etc., an lsof (list open files) command that obtains a list of all open files and the processes that opened them, a trace command that performs diagnostics/debugging, and/or a top command that shows processes that are being executed and obtains information about processing and memory resource utilization by the processes.

After obtaining the characterization, the CI/CD pipeline characterization component 222 can then determine a platform type (e.g., container, virtual machine or bare-metal) for implementing the CI/CD pipeline in view of the characterization. More specifically, the platform type can be selected in view of the use case for the CI/CD pipeline. For example, a virtual machine execution platform can be selected if the characterization is indicative of a use case involving: (1) modifying network interfaces; (2) loading kernel modules; and (3) performing storage related operations (e.g., expanding storage and/or formatting filesystems). As another example, a bare-metal execution platform can be selected if the characterization is indicative of a use case involving performing virtualization operations, such as creating virtual machines, virtualizing network resources, etc. The highest level platform type is generally a container. In some embodiments, a container is set as a default platform type. For example, the container can be selected if the characterization does not provide sufficient information to select the platform type.

Once the platform type is identified, it is possible for the set of candidate execution platforms having that platform type within the pool to include multiple candidate execution platforms having respective sets of resource specifications that can each execute the CI/CD pipeline. To address this situation, the set of candidate execution platforms identified based on platform type can be refined to identify one or more execution platforms that would be most efficient or optimal for executing the CI/CD pipeline. To do so, the characterization of the CI/CD pipeline can be received by a model training component 224 to generate a trained model 226 for selecting a subset of execution platforms from the set of candidate execution platforms. The trained model 226 can be any suitable machine learning model in accordance with the embodiments described herein. Examples of suitable machine learning models include, but are not limited to, classification models, clustering models, neural network models etc.

The component 224 can perform the training by executing the CI/CD pipeline using a training execution platform having a combination of attributes. Input training data can include the combination of attributes and/or the use case indicated by the CI/CD pipeline characterization 222. Execution of the CI/CD pipeline using the training execution platform can be monitored to obtain output training data indicative of a result of the execution of the CI/CD pipeline using the training execution platform, and the input training data can be associated with the output training data. More specifically, the output training data can include data indicative of a successful execution with the combination of attributes, or data indicative of a failed execution with the combination of attributes. The association of output training data (e.g., execution results) with input training data (e.g., combination of attributes) for a number of training execution platforms can be used to train the machine learning model to learn which combinations of attributes can execute the CI/CD pipeline to perform the use case indicated by the CI/CD pipeline characterization 222.

For example, for a classification model, each combination of attributes can be assigned to a class using a class label. For example, for a binary classification model, a first class label can be indicative of a successful execution class (e.g., a "pass" label) and a second class label can be indicative of a failed execution class (e.g., a "fail" label). The classification can be unsupervised (e.g., automatic labeling based on the execution results) or supervised (e.g., manual labeling based on the execution results). Examples of classification models include logistic regression models, k-nearest neighbor models, decision tree models, support vector machine (SVM) models, naive Bayes models, etc.

The trained model 226 can use these classifications to identify whether a particular execution platform having an input combination of attributes can execute the CI/CD pipeline. Accordingly, the trained model 226 can be used to select a set of execution platforms having a combination of attributes that are determined (e.g., predicted) to successfully execute the CI/CD pipeline.

To ensure that execution platform resources can be available in the pool for assignment with respect to more resource-intensive CI/CD pipeline implementations, the trained model 226 can be further trained to prioritize selection of a subset of execution platforms from the set of candidate execution platforms. For example, if a first training execution platform determined to have a successful first combination of attributes has a lower memory (e.g., RAM) specification as compared to a second training execution platform determined to also have a successful second combination of attributes, the trained model 226 can prioritize selection of an execution platform having the first combination of attributes, at least relative to an execution platform having the second combination of attributes (e.g., based on availability). Accordingly, the trained model 226 can be trained to select, from the set of candidate execution platforms that are available, a subset of execution platforms that have a minimum resource capability to execute the CI/CD pipeline. Further details regarding generating the trained model 226 will be described below with reference to FIG. 4.

As further shown, the system 200 can include an assignment manager 230. As will be described in further detail below, the assignment manager 230 can receive a definition 210-2 corresponding to a CI/CD pipeline (which can be different from the definition 210-1), and assign a set of execution platforms to the CI/CD pipeline based on the definition 210-2.

For example, the assignment manager 230 can include a CI/CD pipeline characterization component 232 to receive the definition 210-2, obtain a characterization indicative of a use case of the CI/CD pipeline in view of the definition 210-2, and determine a platform type for implementing the CI/CD pipeline in view of the characterization (e.g., container, virtual machine or bare-metal) (e.g., similar to the functionality performed by the component 222).

The assignment manager 230 can further include an execution platform selection component 234 that selects a subset of execution platforms from a set of candidate execution platforms available for implementing the CI/CD pipeline. The set of candidate execution platforms can include one or more executions platforms having the platform type that are available for assignment to the CI/CD pipeline, and the subset of execution platforms can include one or more of the candidate execution platforms having a combination of attributes to implement the CI/CD pipeline. For example, the combination of attributes can include the platform type and a set of resource specifications.

In the event that the set of candidate execution platforms includes multiple candidate execution platforms that are available for assignment, the component 234 can use the trained model 226 to identify, from the combination of attributes of each candidate execution platform, the subset of execution platforms as having a resource-efficient combination of attributes implementing the CI/CD pipeline. For example, the component 234 can use the trained model 226 to select, from the set of candidate execution platforms that are available, a subset of execution platforms that have a minimum resource capability among the available candidate execution platforms to successfully execute the CI/CD pipeline. By using the trained model 226 to select the subset of execution platforms in a resource-efficient manner, execution platform resource can be freed up for more resource-intensive implementations.

An execution platform assignment component 236 can then receive the selection of the subset of execution platforms, and assign the CI/CD pipeline to the subset of execution platforms. For example, a message can be sent to the subset of execution platforms to implement the CI/CD pipeline. The message can include the CI/CD pipeline definition and/or a command to execute the CI/CD pipeline definition. In some embodiments, the subset of execution platforms implements the CI/CD pipeline in response to receiving the assignment. In some embodiments, the implementation of the CI/CD pipeline is scheduled for a later time.

Figure 3:
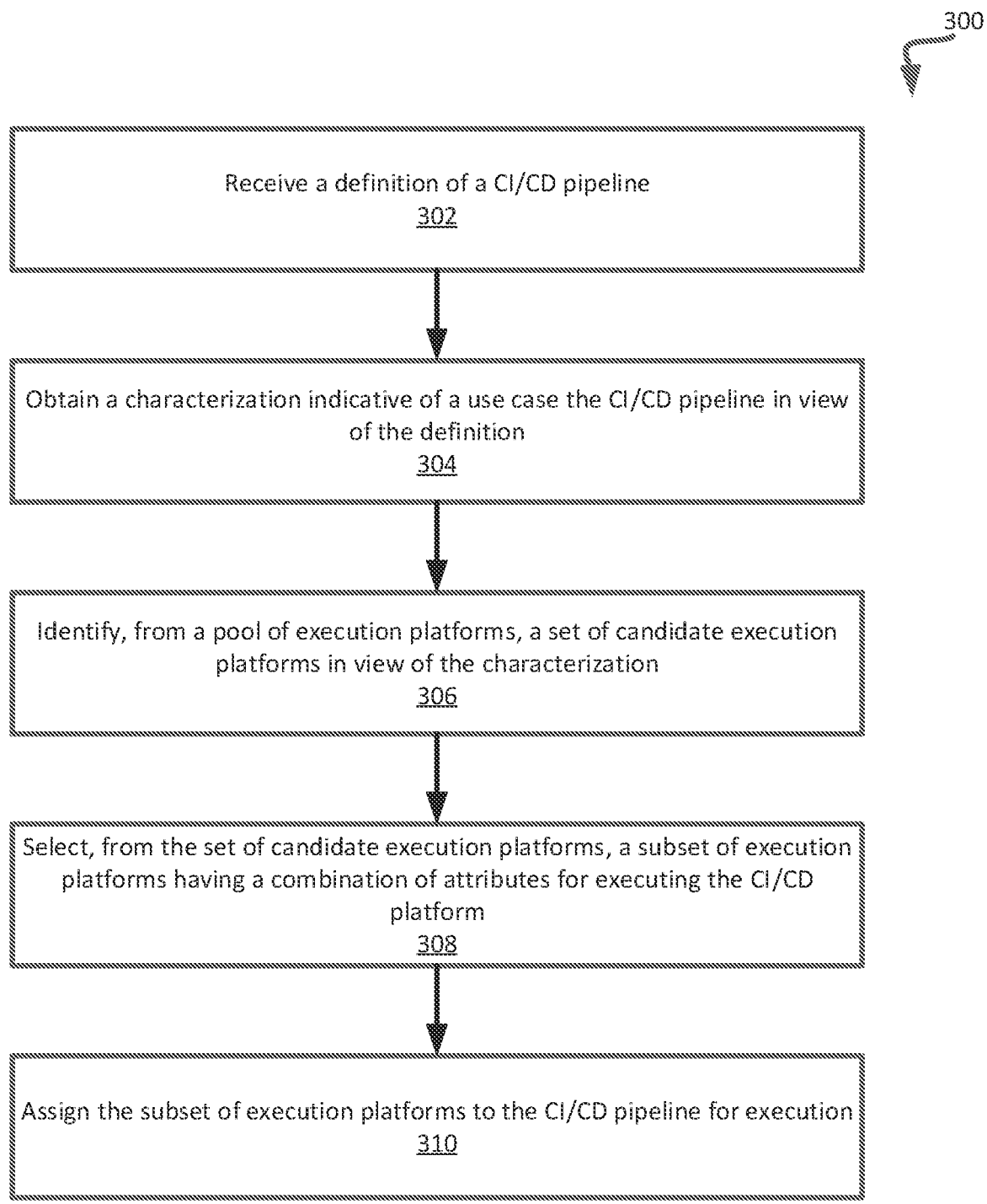
FIG. 3 depicts a flow diagram of a method for assigning a set of execution platforms to a CI/CD pipeline, in accordance with one or more aspects of the present disclosure.

FIG. 3 depicts a flow diagram of an example method 300 for assigning a set of execution platforms to a CI/CD pipeline, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 300 may be performed by a CI/CD manager, such as the CI/CD manager 161 in FIG. 1. Alternatively, some or all of method 300 might be performed by another module or machine. It should be noted that blocks depicted in FIG. 3 could be performed simultaneously or in a different order than that depicted.

At block 302, the processing logic receives a definition of a CI/CD pipeline. The definition can define a set of stages of a CI/CD pipeline within a CI/CD system. Each stage of the set of stages can execute a set of tasks. Each task of the set of tasks can include one or more tasks.

At block 304, the processing logic obtains a characterization indicative of a use case of the CI/CD pipeline in view of the definition. Examples of use cases include application-level testing and OS-level testing. In some embodiments, obtaining the characterization includes expanding the definition to obtain an expanded definition, and identifying the use case from the expanded definition. For example, identifying the use case of the CI/CD pipeline can include analyzing the content of the expanded definition to identify a pattern indicative of the use case of the CI/CD pipeline. Instead of identifying the use case from the expanded definition, in some embodiments, obtaining the characterization includes executing the CI/CD pipeline, and performing a profiling analysis in view of the execution to identify the use case. Further details regarding block 304 are described above with reference to FIG. 2.

At block 306, the processing logic identifies, from a pool of execution platforms, a set of candidate execution platforms based on the characterization. The set of candidate execution platforms can include one or more execution platforms that are available having a platform type (e.g., virtual machine, container, bare-metal) corresponding to the characterization. For example, the platform type can be selected based on the use case identified from the characterization. In some embodiments, the pool of execution platforms is a heterogeneous pool of execution platforms. Further details regarding block 306 are described above with reference to FIG. 2.

At block 308, the processing logic selects, from the set of candidate execution platforms, a subset of execution platforms having a combination of attributes for executing the CI/CD platform. The combination of attributes are attributes for execution platforms that are determined as being sufficient to execute the CI/CD pipeline. For example, the combination of attributes can include a combination of at least one of: the platform type, or a set of resource specifications (e.g., processing, memory. networking).

In some embodiments, the subset of execution platforms is identical to the set of candidate execution platforms. However, it may be the case that the set of candidate execution platforms includes multiple candidate execution platforms that are available having resource specifications that can implement the CI/CD pipeline. Therefore, in some embodiments, the set of candidate execution platforms is refined to identify at least one execution platform of the set of candidate execution platforms that would be most efficient or optimal for implementing the CI/CD pipeline. To refine the set of candidate execution platforms, selecting the subset of execution platforms can further include providing the characterization as input into a trained model, and selecting the subset of execution platforms from the set of candidate execution platforms in view of the corresponding output of the trained model. For example, the trained model can include a classification model, a clustering model, a neural network model, etc. The trained model can be trained to identify, from the set of candidate execution platforms, a subset of execution platforms from the set of candidate execution platforms having a minimum resource capability to successfully execute the CI/CD pipeline. By doing so, execution platform resources can be made available for more resource-intensive implementations, which can enable greater execution platform assignment efficiency. Further details regarding block 308 are described above with reference to FIG. 2.

At block 310, the processing logic assigns the subset of execution platforms to the CI/CD pipeline for execution. For example, a message can be sent to the subset of execution platforms to implement the CI/CD pipeline. The message can include the CI/CD pipeline definition and/or a command to execute the CI/CD pipeline definition. In some embodiments, the subset of execution platforms implements the CI/CD pipeline in response to receiving the assignment. In some embodiments, the implementation of the CI/CD pipeline is scheduled for a later time. Further details regarding block 310 are described above with reference to FIG. 2.

Figure 4:
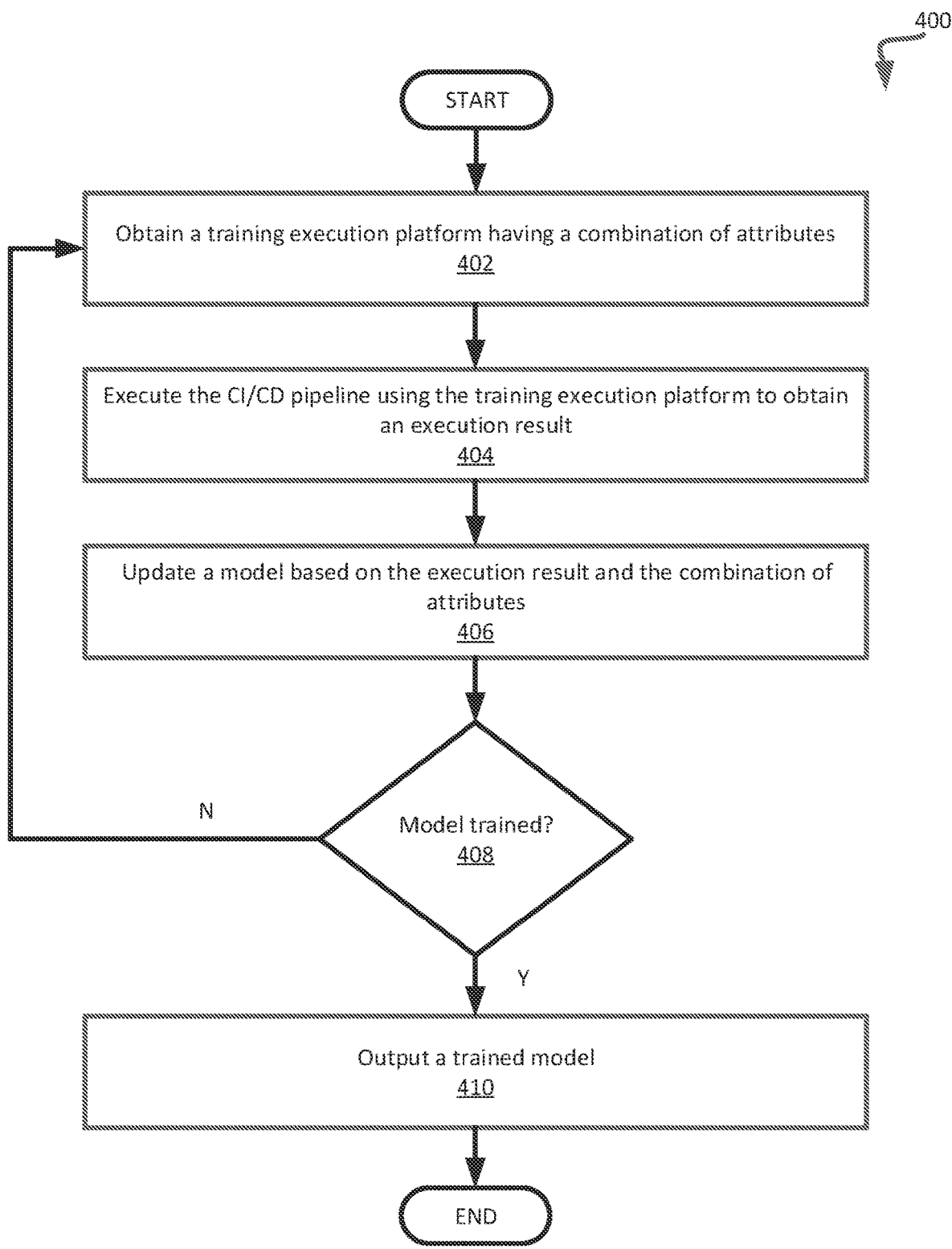
FIG. 4 depicts a flow diagram of a method for training a model for selecting a set of execution platforms for assignment to a CI/CD pipeline, in accordance with one or more aspects of the present disclosure.

FIG. 4 depicts a flow diagram of an example method 400 for training a model for selecting a set of execution platforms for assignment to a CI/CD pipeline, in accordance with one or more aspects of the present disclosure. The method may be performed by processing logic that may comprise hardware (circuitry, dedicated logic, etc.), computer readable instructions (run on a general purpose computer system or a dedicated machine), or a combination of both. In an illustrative example, method 400 may be performed by a CI/CD manager, such as the CI/CD manager 161 in FIG. 1. Alternatively, some or all of method 400 might be performed by another module or machine. It should be noted that blocks depicted in FIG. 4 could be performed simultaneously or in a different order than that depicted.

At block 402, the processing logic obtains a training execution platform having a combination of attributes. The combination of attributes can include a platform type (e.g., virtual machine platform, container platform or bare-metal platform) and/or and a set of resource specifications (e.g., processing, memory). The platform type can be predetermined based on an analysis of a definition of the CI/CD pipeline performed to identify a use case of the CI/CD pipeline, as described above with reference to FIGS. 2-3. For example, obtaining the training execution platform can include selecting the training execution platform as an execution platform having a different combination of attributes (e.g., set of resource specifications) than a previously obtained training execution platform.

At block 404, the processing logic executes the CI/CD pipeline using the training execution platform to obtain an execution result. For example, the execution result can include an indication that execution was a successful execution or a failed execution. Further details regarding block 404 are described above with reference to FIG. 2.

At block 406, the processing logic updates a model based on the execution result and the combination of attributes of the training execution platform. In some embodiments, the model is a classification model. For example, if the execution result indicates a successful execution, this means that the corresponding combination of attributes is acceptable. However, if the execution result indicates a failed execution, then the corresponding combination of attributes is rejected. However, any suitable type of model can be used in accordance with the embodiments described herein (e.g., clustering model, neural network model). Further details regarding block 406 are described above with reference to FIG. 2.

At block 408, it is determined whether the model is trained. Determining whether the model is trained can include determining whether the model can identify a subset of execution platforms, among a set of available execution platforms, having an appropriate combination of attributes to execute the CI/CD pipeline. If not, the process can revert back to block 402 to obtain another training execution platform to further refine the model.

The training can be performed by executing the CI/CD pipeline using a number of training execution platforms with various resource specifications to obtain a set of training outputs, and identifying the set of appropriate execution platforms in view of the set of training outputs. The model can be trained to reject execution platforms from the pool having resource specifications that are determined (e.g., predicted) to fail the CI/CD pipeline execution. To ensure that execution platforms can be available in the pool for assignment with respect to more resource-intensive CI/CD pipeline implementations, the model can be further trained to reject execution platforms having resource specifications that are greater than necessary for executing the CI/CD pipeline. Accordingly, the model can be trained to identify a subset of execution platforms that have a minimum resource capability to execute the CI/CD pipeline.

Illustratively, assume that the CI/CD pipeline began executing on a training execution platform, but execution of the CI/CD pipeline failed due to insufficient memory (e.g., RAM). In this case, the training execution platform can be identified as an unsuitable execution platform due to insufficient memory, and the amount of memory of the training execution platform can be set as a threshold amount of memory. Any execution platform that has less memory than the threshold amount of memory can be disqualified. The optimal amount of memory can then be determined as the minimum amount of memory needed for successfully executing the CI/CD pipeline. A similar technique can be used for other properties, such as platform type. For example, if the CI/CD pipeline is determined to not run properly on an execution platform implemented as a virtual machine, then the process can learn to assign the CI/CD pipeline to an execution platform implemented as a container and/or bare-metal. Further details regarding block 408 are described above with reference to FIG. 2.

Once the model has been trained, the processing logic can output a trained model at block 410. Further details regarding block 410 are described above with reference to FIG. 2. The trained model can then be used to select execution platform(s) for assignment to a CI/CD pipeline, as described in further detail above with reference to FIGS. 2-3.

Figure 5:
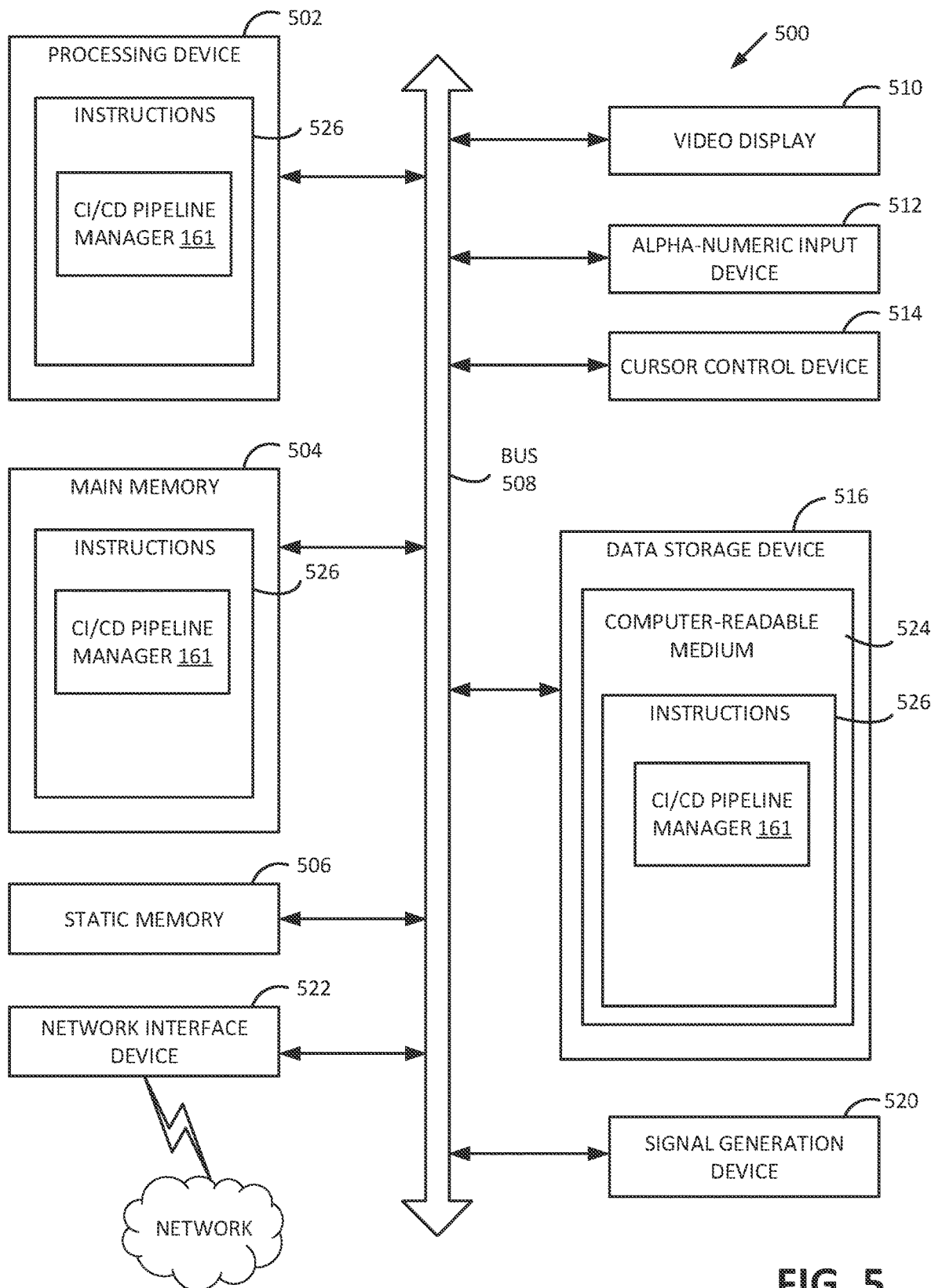
FIG. 5 depicts a block diagram of an illustrative computer system operating in accordance with one or more aspects of the present disclosure.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic (e.g., instructions 526) that includes CI/CD pipeline manager 161 for performing the operations and steps discussed herein (e.g., corresponding to the method of FIGS. 3 and 4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a non-transitory computer-readable medium 524 on which may store instructions 526 that include CI/CD pipeline manager 161 (e.g., corresponding to the method of FIGS. 3 and 4, etc.) embodying any one or more of the methodologies or functions described herein. CI/CD pipeline manager 161 may also reside, completely or at least partially, within the main memory 504 and/or within the processing device 502 during execution thereof by the computer system 500, the main memory 504 and the processing device 502 also constituting computer-readable media. CI/CD pipeline manager 161 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. Other computer system designs and configurations may also be suitable to implement the systems and methods described herein.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "providing," "selecting," "provisioning," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

What is claimed is:

1. A method comprising:
   receiving, by a processing device, a definition of a continuous integration and continuous delivery/deployment (CI/CD) pipeline;
   identifying, by the processing device based on the definition, a use case of the CI/CD pipeline;
   identifying, by the processing device, a heterogeneous pool of execution platforms;
   selecting, by the processing device from the heterogeneous pool of execution platforms, a set of execution platforms having a combination of attributes for executing the CI/CD pipeline in accordance with the use case of the CI/CD pipeline; and
   assigning, by the processing device, the set of execution platforms to the CI/CD pipeline for execution of the CI/CD pipeline in accordance with the use case of the CI/CD pipeline.

2. The method of claim 1, wherein the use case comprises at least one of:
   application testing or operating system testing.

3. The method of claim 1, wherein identifying the use case further comprises obtaining a characterization of the CI/CD pipeline indicative of the use case of the CI/CD pipeline, and wherein obtaining the characterization comprises:
   expanding the definition to obtain an expanded definition; and
   identifying, from the expanded definition, content indicative of the use case of the CI/CD pipeline.

4. The method of claim 3, wherein the content comprises at least one of: a set of tests that are indicative of the use case, or a set of commands that are indicative of the use case.

5. The method of claim 1, wherein identifying the use case of the CI/CD pipeline further comprises:
   executing the CI/CD pipeline to obtain an execution result; and
   performing a profiling analysis in view of the execution result to identify the use case.

6. The method of claim 1, wherein the combination of attributes comprises a combination of at least one of: a platform type, or a set of resource specifications.

7. The method of claim 1, wherein identifying the set of execution platforms further comprises identifying a platform type corresponding to the use case of the CI/CD pipeline.

8. The method of claim 1, wherein the combination of attributes comprises a minimum set of resource specifications for executing the CI/CD pipeline.

9. The method of claim 1, wherein identifying the use case of the CI/CD pipeline further comprises obtaining, in view of the definition, a characterization of the CI/CD pipeline indicative of a use case of the CI/CD pipeline, and wherein selecting the set of execution platforms further comprises:
providing the characterization as input into a trained model; and
selecting the set of execution platforms based on a corresponding output of the trained model.

10. A computing system comprising:
a memory; and
a processing device, operatively coupled to the memory, to perform operations comprising:
receiving a definition of a continuous integration and continuous delivery/deployment (CI/CD) pipeline;
identifying, based on the definition, a use case of the CI/CD pipeline;
identifying from a heterogeneous pool of execution platforms;
selecting, from the heterogeneous pool of execution platforms, a set of execution platforms having a combination of attributes for executing the CI/CD pipeline in accordance with the use case of the CI/CD pipeline; and
assigning the set of execution platforms to the CI/CD pipeline for execution of the CI/CD pipeline in accordance with the use case of the CI/CD pipeline.

11. The computing system of claim 10, wherein the use case comprises at least one of: application testing or operating system testing.

12. The computing system of claim 10, wherein identifying the use case further comprises obtaining a characterization of the CI/CD pipeline indicative of the use case of the CI/CD pipeline, and wherein obtaining the characterization comprises:
expanding the definition to obtain an expanded definition; and
identifying, from the expanded definition, content indicative of the use case of the CI/CD pipeline.

13. The computing system of claim 12, wherein the content comprises at least one of: a set of tests that are indicative of the use case, or a set of commands that are indicative of the use case.

14. The computing system of claim 10, wherein identifying the use case of the CI/CD pipeline further comprises:
executing the CI/CD pipeline to obtain an execution result; and
performing a profiling analysis in view of the execution result to identify the use case of the CI/CD pipeline.

15. The computing system of claim 10, wherein the combination of attributes comprises a combination of at least one of: a platform type, or a set of resource specifications.

16. The computing system of claim 10, wherein identifying the set of execution platforms further comprises identifying a platform type corresponding to the use case of the CI/CD pipeline.

17. The computing system of claim 10, wherein the combination of attributes comprises a minimum set of resource specifications for executing the CI/CD pipeline.

18. The computing system of claim 10, identifying the use case of the CI/CD pipeline further comprises obtaining, in view of the definition, a characterization of the CI/CD pipeline indicative of a use case of the CI/CD pipeline, and wherein selecting the set of execution platforms further comprises:
providing the characterization as input into a trained model; and
selecting the set of execution platforms based on a corresponding output of the trained model.

19. A computing system comprising:
a memory; and
a processing device, operatively coupled to the memory, to perform operations comprising:
obtaining a combination of attributes for executing a continuous integration and continuous delivery/deployment (CI/CD) pipeline in accordance with a use case of the CI/CD pipeline, wherein the combination of attributes comprises a platform type and a set of resource specifications;
executing the CI/CD pipeline in accordance with the use case of the CI/CD pipeline to obtain an execution result; and
training a model, based on the execution result and the combination of attributes, to select, from a heterogeneous pool of execution platforms, a set of execution platforms to be assigned to the CI/CD pipeline in accordance with the use case of the CI/CD pipeline.

20. The computing system of claim 19, wherein the operations further comprise:
determining that the model is trained; and
in response to determining that the model is trained, outputting a trained model.

\* \* \* \* \*